United States Patent
Mathur et al.

(10) Patent No.: US 9,104,853 B2
(45) Date of Patent: Aug. 11, 2015

(54) SUPPORTING PROXIMITY BASED SECURITY CODE TRANSFER FROM MOBILE/TABLET APPLICATION TO ACCESS DEVICE

(71) Applicant: SYMANTEC CORPORATION, Mountain View, CA (US)

(72) Inventors: Mohit Mathur, Singapore (SG); Srinath Venkataramani, Bangalore (IN)

(73) Assignee: SYMANTEC CORPORATION, Mountain View, CA (US)

( * ) Notice: Subject to any disclaimer, the term of this patent is extended or adjusted under 35 U.S.C. 154(b) by 64 days.

(21) Appl. No.: 13/895,478

(22) Filed: May 16, 2013

(65) Prior Publication Data

US 2014/0344904 A1    Nov. 20, 2014

(51) Int. Cl.
*H04L 9/32* (2006.01)
*H04L 9/00* (2006.01)
*G06F 21/35* (2013.01)
*H04L 29/06* (2006.01)

(52) U.S. Cl.
CPC ............ *G06F 21/35* (2013.01); *H04L 63/0853* (2013.01)

(58) Field of Classification Search
CPC ... H04L 63/08; H04L 63/083; H04L 63/0853; H04L 63/0867; H04L 63/0876; H04W 12/06; H04W 12/08; G06F 2221/2111; G06F 21/35
USPC .................. 380/255, 258, 270; 713/168–173, 713/182–186; 726/2–6, 16–21
See application file for complete search history.

(56) References Cited

U.S. PATENT DOCUMENTS

| | | | | |
|---|---|---|---|---|
| 7,213,766 | B2 * | 5/2007 | Ryan et al. | 235/492 |
| 8,112,066 | B2 * | 2/2012 | Ben Ayed | 455/411 |
| 8,689,002 | B2 * | 4/2014 | Yamamoto | 713/182 |
| 2014/0181955 | A1 * | 6/2014 | Rosati | 726/18 |

OTHER PUBLICATIONS

YubiKey NEO; Oct. 12, 2012; <http://www.yubico.com/yubikey-neo>, retrieved from Internet Archive Wayback Machine <http://web.archive.org/web/20121012053923/http://www.yubico.com/yubikey-neo> on Oct. 18, 2014.
YubiKey NEO developer information; Oct. 25, 2012; <http://yubico.com/yubiKey-neo-documentation>, retrieved from Internet Archive Wayback Machine <http://web.archive.org/web/20121025134530/http://yubico.com/yubikey-neo-documentation> on Oct. 18, 2014.

(Continued)

*Primary Examiner* — Hosuk Song
(74) *Attorney, Agent, or Firm* — Patterson & Sheridan LLP (57) ABSTRACT

Techniques are disclosed for authenticating users to a computing application. A mobile or tablet device is used to generate a security code. Near field communication (NFC) hardware on the mobile device is used to transfer the security code from the mobile device to a computer. To transfer the one-time value, a user simply taps an NFC enabled mobile device on an NFC enabled computing device (e.g. a laptop running a web browser used to access a web service). In one embodiment, doing so triggers a connection between the two devices and an application running on the mobile device transfers the security code to an NFC receiver application running on the computer. The receiving computer may be configured to auto-fill the received security code in the appropriate form field of the application authentication interface.

15 Claims, 7 Drawing Sheets

(56) References Cited

OTHER PUBLICATIONS

"Entrust Uses near-Field Communication, Bluetooth to Bring Enterprise Credentials, Management to Popular Mobile Devices", Feb. 28, 2012; <www.entrust.com/news>, retrieved from Internet Archive Wayback Machine <http://web.archive.org/web/20130506051837/www.entrust.com/news/index.php?s=27003&item=122699> on Oct. 18, 2014.

Network Products guide: "Stina Ehrensvard on how individual Internet users can secure their online identity, including email, social media accounts, and more"; <http://www.networkproductsguide.com/people/Stina-Ehrensvard.html>, retrieved from Internet Archive Wayback Machine <http://web.archive.org/web/20120626213244/http://www.networkproductsguide.com/people/Stina-Ehrensvard.html> on Oct. 18, 2014.

* cited by examiner

SUPPORTING PROXIMITY BASED SECURITY CODE TRANSFER FROM MOBILE/TABLET APPLICATION TO ACCESS DEVICE

BACKGROUND

1. Field

Embodiments of the invention generally relate to techniques for authenticating users in accessing computing applications. More specifically, techniques are disclosed for transferring a security value from a handheld device to an entry field an on application authentication interface.

2. Description of the Related Art

Protecting access to computing systems is a well known issue in a broad variety of contexts. For example, it is common for a computing application to require users to provide a username and password. As more computing applications are accessed in a distributed manner, e.g., by accessing applications hosted in a cloud based environments, simple passwords frequently provide inadequate security. More generally, passwords suffer from a number of drawbacks, primarily that they may be forgotten, guessed, or otherwise disclosed or obtained. For example, users frequently choose insecure passwords that can be broken using a "dictionary" attack.

To improve security, and provide more reliable authentication mechanisms, a variety of approaches have been developed. For example, applications may use a security code or one time value as a second factor to authenticate a user or authorize a transaction. Similarly, public key infrastructure (PKI) techniques are used to create, distribute, and manage cryptographic keys used to control access to an application. However, two-factor authentication is often difficult to deploy and use and this fact has become a deterrent for adopting this technology. For example, some authentication mechanisms use an authentication token which can provide an value which a user must provide in addition to a username and password to access an application or service (or to authorize a requested transaction). Typically however, users have to manually enter a security code presented on a device each time a user accesses the application or service. This approach adds overhead of manual launch, generating, and typing a security code every time anyone accesses the application. This results in a cumbersome and poor user experience.

SUMMARY

Embodiments presented herein include a method for performing a two-factor authentication process. This method may generally include detecting a mobile computing device being positioned within a specified proximity of a computing device, establishing a connection with the mobile computing device, receiving, over the connection, a security value, and populating a login form with the security value.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments provide an easy to use user experience for accessing an application or service (or authenticating a transaction) while also performing a strong two-factor authentication process. In one embodiment, a mobile or tablet device is used to generate (or obtain) a one-time value, referred to as a security code. Near field communication (NFC) hardware on the mobile device is used to transfer the security code from the mobile device to a computer using NFC communication protocols. To transfer the one-time value, a user simply taps an NFC enabled mobile device on an NFC enabled computing device (e.g. a laptop running a web browser used to access a web service). In one embodiment, doing so triggers a connection between the two devices, and an application running on the mobile device transfers the security code to an NFC receiver application running on the computer. The receiving computer may be configured to auto-fill the received security code in the appropriate form field of the application authentication interface. Doing so eliminates the overhead of and errors resulting from manually typing the security code, while ensuring the same level of security.

Accordingly, embodiments provide an effective user experience for accessing applications or online services requiring two-factor authentication. Rather than manually launching the application used to generate the security code, noting it down from a mobile device, and typing it into the authentication interface, NFC (or other proximity based communication) detects other NFC enabled devices in proximity, establishes a connection, and securely transfers a security code to the other device. For example, in one embodiment, the application is accessed as a web service from a client browser. In such a case, the browser may present a login page for the application where a user enters a username and password into a form. Further, the form may include a field for a second-factor authentication value. In one embodiment, this value is generated by a mobile device and passed to an NFC receiver, e.g., implemented as a browser helper object (BHO)). The BHO enters the second factor in the field of the login page received over the NFC connection.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, a cloud based application may be configured to present a two-factor authentication challenge to a user. In response, a user enters a username and password. To provide the secondary authentication factor, a user may position a mobile device within proximity of a NFC transceiver on a client computer. In response, an application on the mobile device generates a one-time security value and passes it to the client computer. Note, while described herein using NFC communications performed between a mobile device and a browser as a reference example, one of ordinary skill in the art will recognize that a variety of computing applications may be configured to receive a onetime value from a mobile device (e.g., mobile phone, tablet, PDA, or other handheld device).

Figure 1:
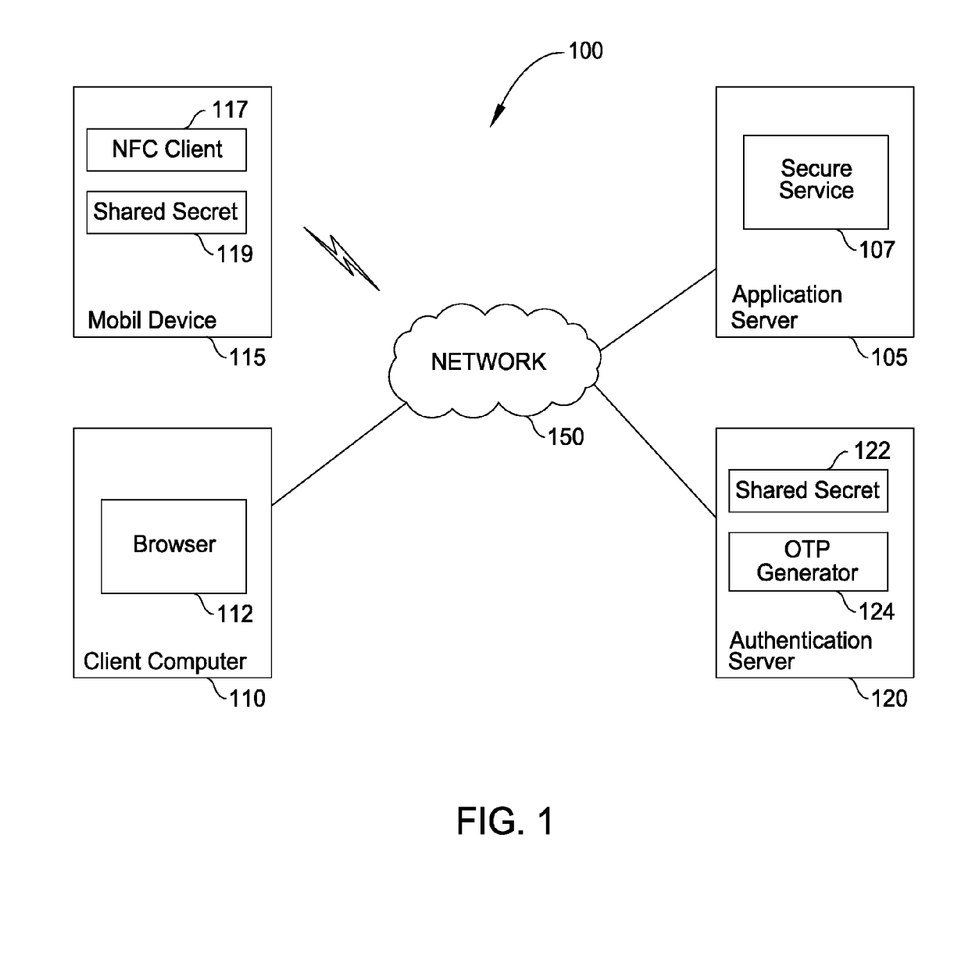
FIG. 1 illustrates an example computing environment, according to one embodiment.

FIG. 1 illustrates an example computing environment 100, according to one embodiment. As shown, the computing environment 100 includes a server computer 105 hosting a computing resource (e.g., application/service 107), an authentication server 120, a mobile device 115, and a client computer 110, each connected to a network 150. As described below, the computing environment 100 allows a user to perform a two-factor authentication process using one-time values passed from an NFC client 117 on the mobile device 115 to a browser 112 on the client computer 110.

The server computer 105 may be a physical computing system (e.g., a system in a data center) or may be a virtual computing instance executing within a computing cloud. In any event, the computing system 105 hosts an application/service 107 (also referred to as a relying application) accessed by clients using computing system 110, e.g., a laptop or desktop computer. For example, a user may access service 107 using a web browser 112. In such a case, the relying application 107 sends a login page rendered on browser 112. The browser 112 renders the login page, prompting the user to enter a username and password. In addition, the rendered page may also include a form field for entering a security code or one-time value.

During the login process (or when validating a transaction) the user enters a security code as a second factor. To do so, in one embodiment, the user performs a simple tap gesture with mobile device 115 by bringing it within proximity of client computer 110. The mobile device 115 generally corresponds to any mobile phone, handheld PDA, computing tablet, or specialized dongle configured with near field communication (NFC) communication hardware and software components configured to create one-time values (e.g., NFC client 117 and shared secret 119). When a user brings the mobile device 115 within proximity of the client computer 110, doing so triggers a NFC connection between the mobile device 115 and client computer 110. In turn, an NFC client 117 running on mobile device 115 generates a one-time value based, in part, on shared secret 119. The NFC client 117 then transfers the one-time value to browser 112 over the NFC connection, where it is received by an add-on or plug-in running on the client computer 110. The browser add-on running on browser 112 then populates the second factor form field of the login page with the received security code.

While a variety of NFC protocols or approaches may be used, in one embodiment, NFC communication is implemented using the Windows.Networking.Proximity namespace APIs provided by the Microsoft Windows 8® operating system. The Proximity APIs enables communication with other devices within proximate range of 3-4 centimeters and exchanges data during a "tap" gesture. Of course, the communication between NFC client 117 on mobile device 115 and browser 112 on client computer 110 can also take place using other wireless communication protocols, e.g., Bluetooth, Infrastructure network, or Wi-Fi Direct.

In one embodiment, the NFC client 117 executing on mobile device 115 generates the one-time value based on a shared secret 119. For example, the NFC client 117 may implement a version of the HMAC-based One Time Password algorithm (HOTP), as published in RFC 4226. In such a case, one time password is generated from a shared secret 119 (i.e., a key) and a counter. Once generated, e.g., in response to a tap gesture, the NFC client 117 passes the security value to browser 112. The browser 112 then passes the credentials supplied by the user, including the security value, to the online service, i.e., the browser 112 passes the credentials to the secure application 107.

In turn, the application 107 communicates with the authentication server 120 to validate the username and password credentials (or values derived therefrom) and the one-time value supplied by the browser 112. Illustratively, the authentication server 20 has access to shared secret 122 (corresponding to shared secret 119) and OTP generator 124. The OTP generator 124 creates a copy of the one-time value to compare with the one being authenticated and returns an authentication status to the relying application 107 running on server 105. Based on the authentication status, the relying application 107 either grants or denies access to the requested resources on server 105. Note, while shown as separate computing applications running on separate computing services for clarity, the OTP generator 124 may be executed on the same computing system as the relying application 107. Similarly, in another embodiment, the relying application 107 may implement the OTP generator 124 and access shared secret 122 to authenticate a user directly.

Figure 2:
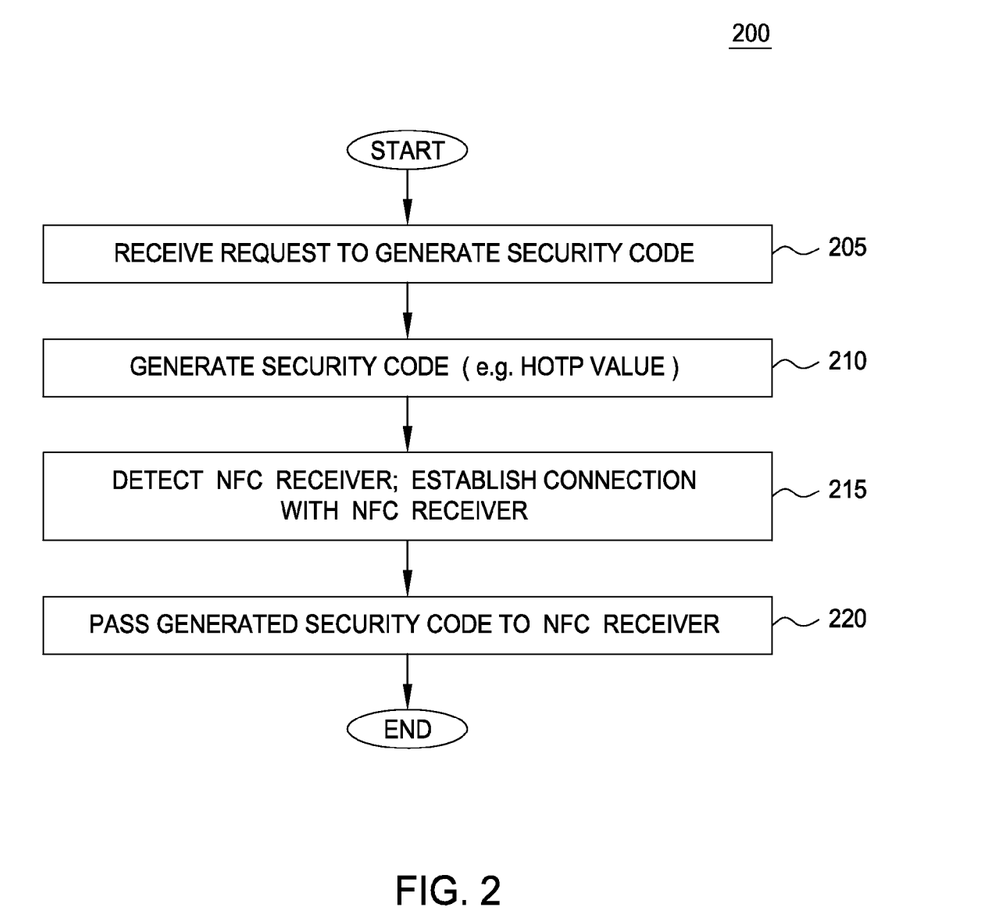
FIG. 2 illustrates a method for mobile device to generate and transfer a one-time value to an application, according to one embodiment.

FIG. 2 illustrates a method 200 for mobile device to generate and transfer a one-time value to an application, according to one embodiment. More specifically, method 200 illustrates the authentication process described above from the perspective of the mobile device. As shown, the method 200 begins at step 205 when an NFC client receives a request for a security value. As noted, the security code may be a one-time value used as a second authentication factor in a login process, e.g., an HMAC-HOTP generated using a shared secret stored on the mobile device (and a counter). In one embodiment, the request is generated in response to the mobile device being moved within proximity of an NFC transceiver on a computer.

At step 210, the NFC client on the mobile device generates the security value to pass to the application. Once generated, the mobile device establishes a connection with the NFC receiver on the computer and at step 220, the security value is transmitted to the application. In one embodiment, the security value may be passed to a browser helper object or plug-in installed on the client computer. In turn, the plug-in populates a form field with the security value. For example, when accessing a secure web application, a login page may present a user with text fields for a username, password, and one-time value as a second authentication factor. After entering a username and password, the user launches an NFC client application and taps it near an NFC transceiver on their computer. After establishing a connection, the NFC client passes the current one time value, i.e., the security value, to a plug-in on the browser, which populates the text field with the one-time value.

Figure 3:
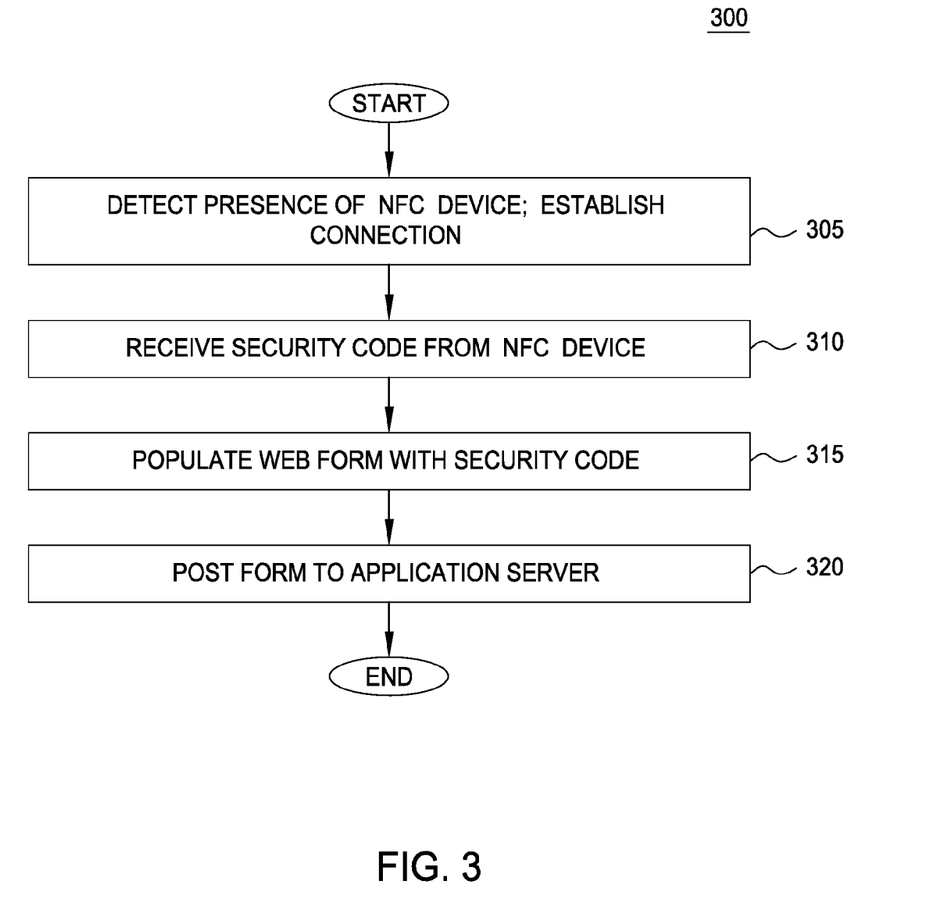
FIG. 3 illustrates a method for a computing device to receive and use a one-time authentication value, according to one embodiment.

FIG. 3 illustrates a method 300 for a computing device to receive and use a one-time authentication value, according to one embodiment. More specifically, method 300 illustrates the authentication process described above from the perspective of an application on a client computer. As shown, the method 300 begins at step 305, where NFC hardware (or other wireless communication components) on the computer detects the presence of an NFC device. For example, the user may hold a mobile phone near an NFC transceiver on a client computer (e.g., laptop or other computer). When this occurs, the client computer establishes a connection with the mobile device and receives the security code (i.e., the one-time value) from the NFC client on the mobile device (step 310). Once received, the value is passed by the NFC components on the client computer to a browser helper object or plug in registered to receive the security value. As noted, in one embodiment, the browser helper object may invoke the Windows.Networking.Proximity namespace APIs provided by the Microsoft Windows 8® operating system (or comparable APIs for other operating systems). At step 315, the browser helper object populates a text field (or other form element) with the received value. And at step 320, the web-form is posted to the secure application, which can then authentication the user based on the username, password, and second-factor security value.

Figure 4:
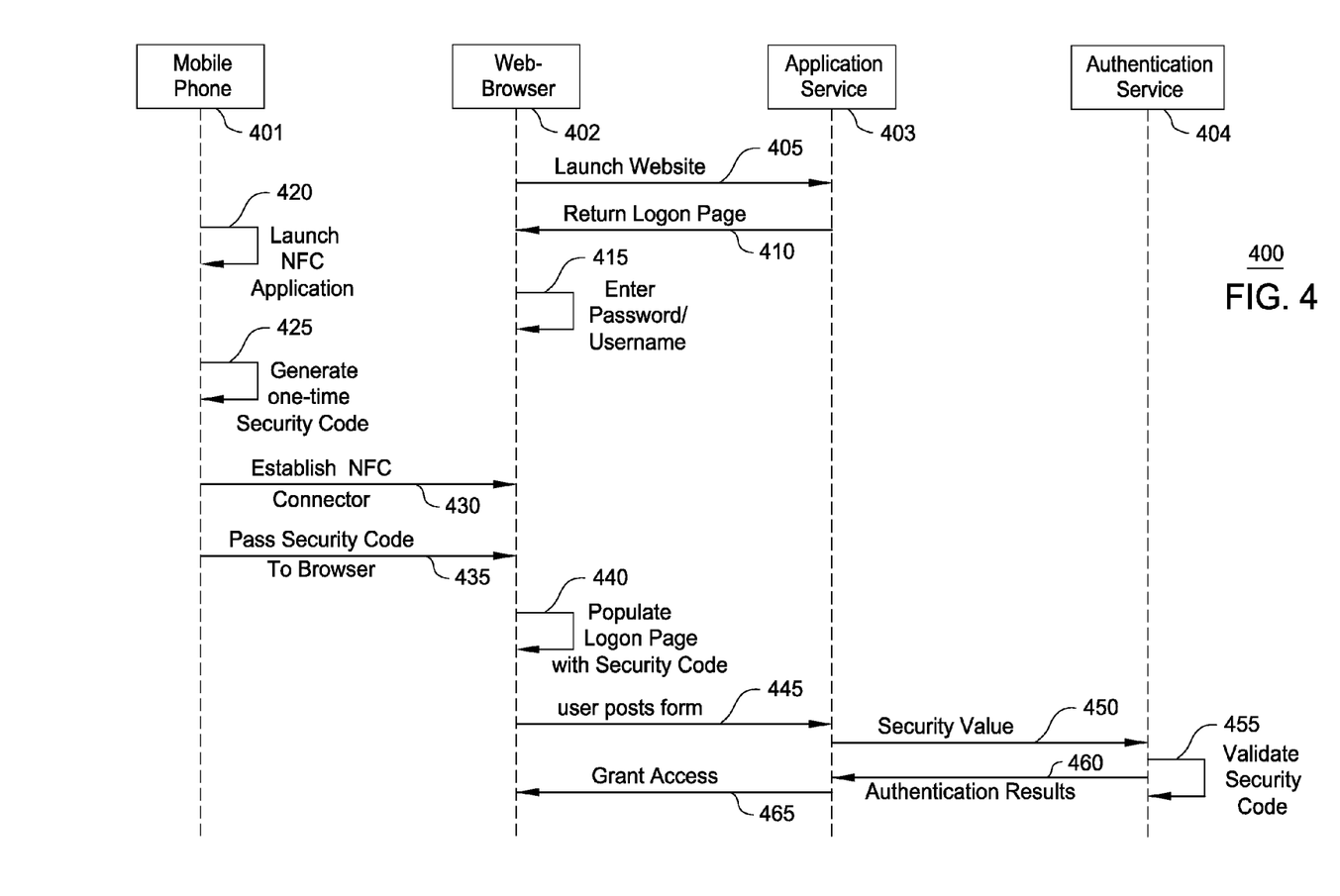
FIG. 4 illustrates a sequence diagram for performing a two-factor authentication process, according to one embodiment.

FIG. 4 illustrates a sequence diagram for performing a two-factor authentication process, according to one embodiment. In the example of FIG. 4, a user interacts with a web browser and mobile phone to perform a two factor authentication process with a web-based application. As shown at 405, a web browser 402 requests a login page from a hosted application or service 403. At 410, the application 403 returns a login page to the browser 402. At 415, the user enters a username and password in text fields of the login page. At 420, the user launches the NFC application on mobile device 401. In response, at 425, the NFC application generates a security code. At 430, the mobile device 401 establishes an NFC connection with the computing system executing web browser 402. Once established, the mobile device 401 passes the security code to the browser (at 435). As noted, the user may effectuate the transfer by bringing the mobile device in proximity to a NFC transceiver on the computing device. In another embodiment, the user may not need to launch the application separately, and instead simply moves the mobile device 401 in proximity to the computing device. In response, the mobile device 401 may be configured to automatically generate a one-time value and pass it to a browser helper object on the browser 402.

In any case, once the browser 402 receives the security code from the mobile device 401 over the NFC connection (or other wireless connection), the browser 402 populates an entry field on the login page with the security value (at 440). At 445, user can then post the completed form to the application 403. In turn, the application 403 may pass the user's credentials and the one time value to an authentication service 404. At 430, the authentication service 404 passes an authentication result to the web application 403. Assuming the credentials were valid, the application then grants access to the user at 465.

Figure 5:
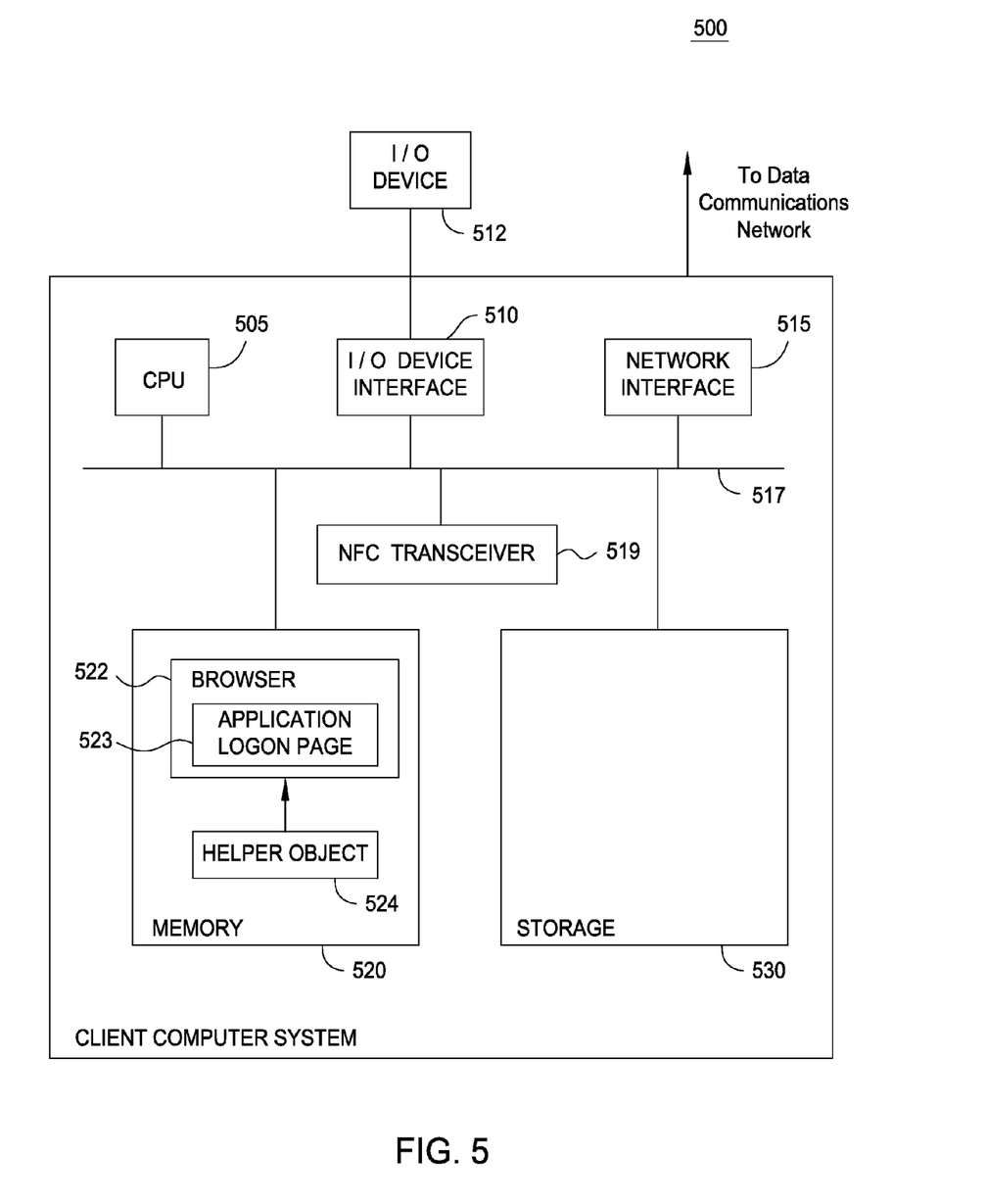
FIG. 5 illustrates an example computing system configured with a relying application configured to authenticate users with a barcode challenge, according to one embodiment.

FIG. 5 illustrates an example computing system 500 configured with a relying application configured to authenticate users with a barcode challenge, according to one embodiment. As shown, the computing system 500 includes, without limitation, a central processing unit (CPU) 505, a network interface 515, a network interface 515, a memory 520, storage 530, and an NFC transceiver, each connected to a bus 517. The computing system 500 may also include an I/O device interface 510 connecting I/O devices 512 (e.g., keyboard, display and mouse devices) to the computing system 500.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Illustratively, the memory 520 includes browser 522 rendering an application login page 520 on a display device. As noted above, the application login page may include entry fields for a username, a password, and a security value (i.e., a secondary a authentication factor). Further, the browser helper object 524 receives the security value transmitted from a mobile device to NFC transceiver 519. Once received, the helper object 524 populates the entry field on the login page with the security value.

Figure 6:
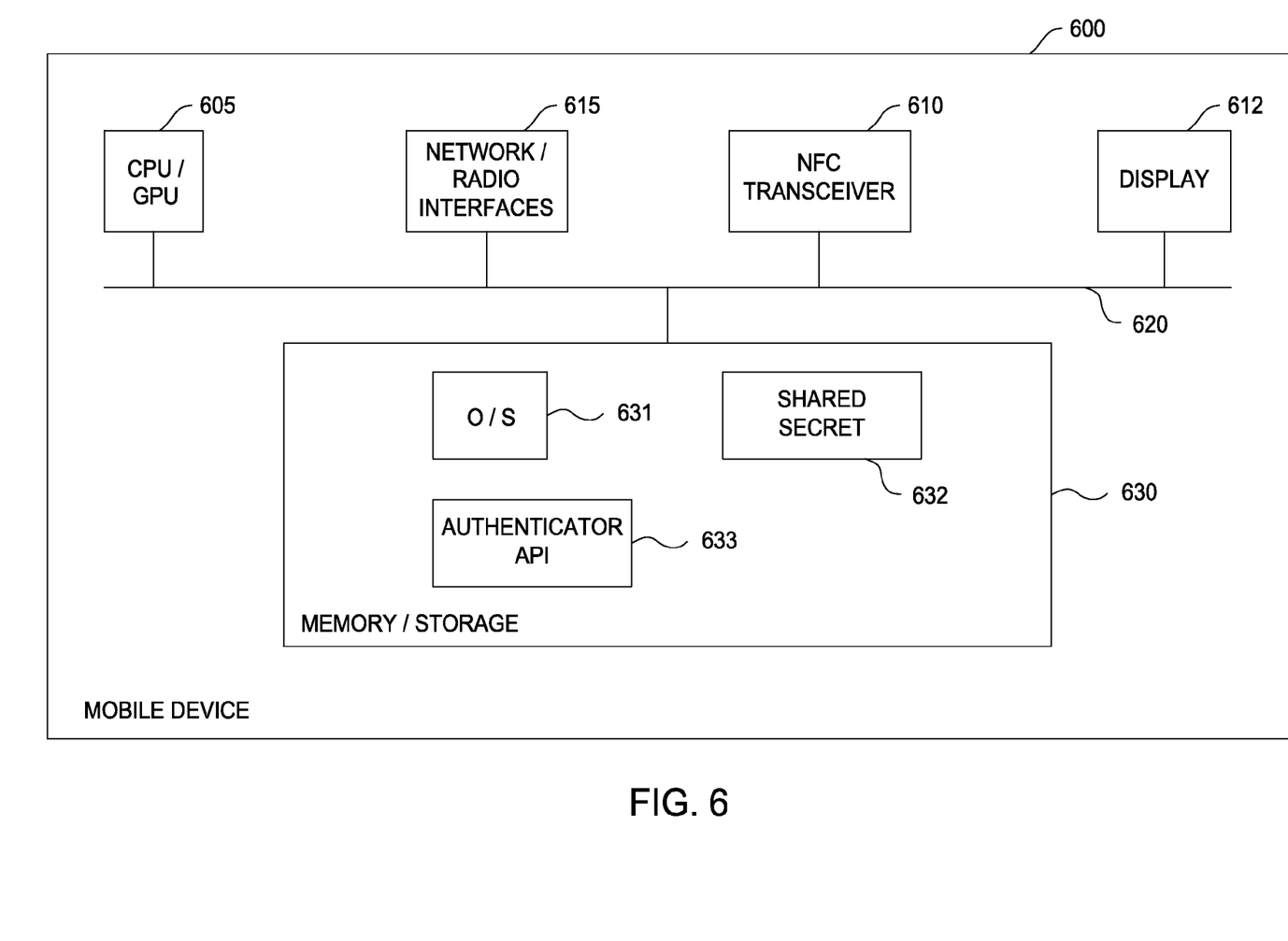
FIG. 6 illustrates an example mobile device storing a shared security used to create a security value used as a secondary authentication factor, according to one embodiment.

FIG. 6 illustrates an example mobile device 600 storing a shared security used to create a security value used as a secondary authentication factor, according to one embodiment. In this example, device 600 is used to be representative of a mobile telephone (commonly referred to as a Smartphone) with a touch sensitive display 612 and a NFC transceiver 610. Of course, embodiments of the invention may be adapted for use with a variety of computing devices, including PDAs, handheld video game systems, tablet computers, and other computing devices configured with near field communication components (or other wireless components, e.g., Bluetooth® or 802.11 wireless networking components).

As shown, the handheld device 600 includes, without limitation, a central processing unit and graphics processing unit (CPU/GPU) 605, network/radio interfaces 615, an interconnect 620, and a memory 630. Of course, an actual handheld device will include a variety of additional hardware components.

The CPU/GPU 605 retrieves and executes programming instructions stored in the memory 630. Similarly, the CPU/GPU 605 stores and retrieves application data residing in the memory 630. The interconnect 620 is used to transmit instructions and data between the CPU/GPU, storage 630, network interfaces 615, and memory 630. CPU/GPU 605 is included to be representative of a single CPU, multiple CPUs, a single CPU having multiple processing cores, and the like.

And the memory 630 is generally included to be representative of memory and storage on a mobile device, e.g., DDR and flash memory modules.

Illustratively, the memory 630 includes a mobile operating system (O/S) 631, an authenticator app 633, and a shared secret 632. The mobile O/S 631 provides software configured to control the execution of application programs on the handheld device. The authenticator app 633 generally provides a software application configured to establish a connection with hardware on a computing device, to generate a security value based (in part) on shared secret 632. As noted, the authenticator app 633 may implement a version of the HMAC-based One Time Password algorithm (HOTP), as published in RFC 4226. In such a case, one time password is generated from a shared secret 632 (i.e., a key) and a counter. In response to a tap gesture brining device 600 within proximity of an NFC transceiver on a user's computer system, the authenticator app 633 passes the security value to that computer system. A browser then.

Figure 7A:
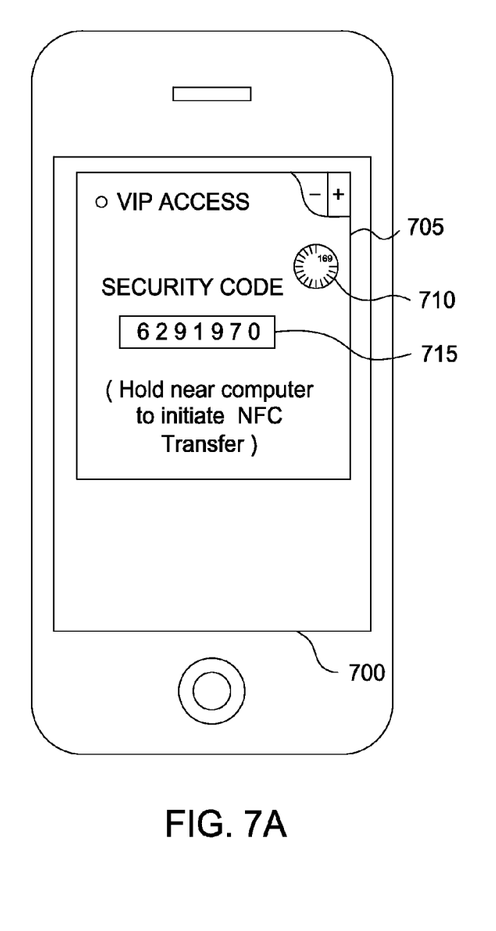
FIG. 7A-7B illustrates user interfaces, according to one embodiment.
Figure 7B:
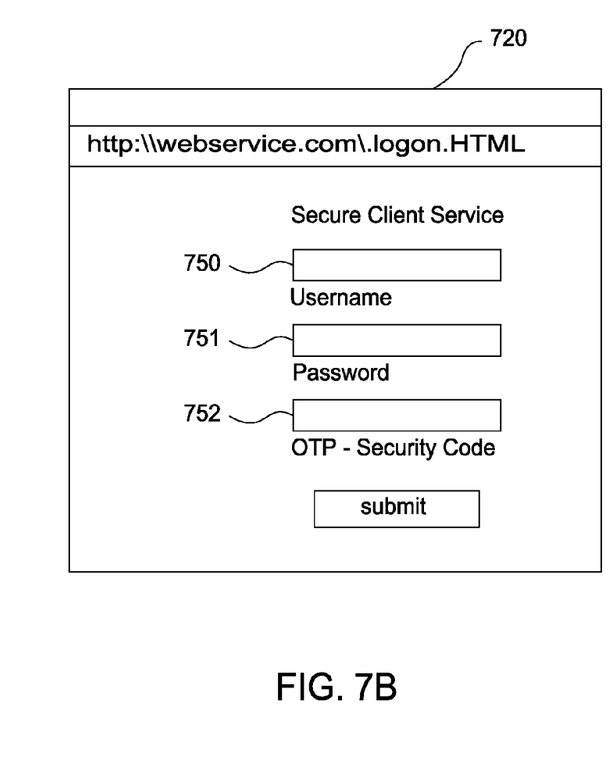

FIG. 7A illustrates an example interface 705 presenting a security value that may be passed, via NFC communications, to a browser on a computer. As shown, the interface 705 includes a current security code value 715 and a timer 710 showing how long the current one-time value will remain valid. In addition the interface 705 shows instructions to position mobile device 700 within proximity of an NFC receiver on a computer. FIG. 7B shows an example logon interface 720 on a computer system. As shown, the interface 720 includes text entry fields 750, 751, and 752 for a username, password, and security value. After a user enters a username and password the security code field 620 may be automatically populated by a browser helper object which receives a security value from a mobile device.

As described, embodiments presented herein provide techniques for performing authenticating a user (or transaction) that includes a second authentication factor. In one embodiment, a mobile or tablet device is used to generate (or obtain) a one-time value, referred to as a security code. Near field communication (NFC) hardware on the mobile device is used to transfer the security code from the mobile device to a computer using NFC communication protocols. To transfer the one-time value, a user simply taps an NFC enabled mobile device on an NFC enabled computing device (e.g. a laptop running a web browser used to access a web service). In one embodiment, doing so triggers a connection between the two devices, and an application running on the mobile device transfers the security code to an NFC receiver application running on the computer. The receiving computer may be configured to auto-fill the received security code in the appropriate form field of the application authentication interface. Doing so eliminates the overhead of and errors resulting from manually typing the security code, while ensuring the same level of security.

In the foregoing, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for performing a two-factor authentication process, the method comprising:
   detecting a mobile computing device being positioned within a specified proximity of a computing device;
   establishing a connection with the mobile computing device;
   receiving, over the connection, a security value;

passing the security value to a browser helper object on the computing device;

populating a login form with the security value, wherein the login form is rendered on a browser executing on the computing device, wherein the login form includes fields for a username, a password, and the security value, and wherein the browser helper object populates the field for the security value with the security value; and posting the login form to a network application.

2. The method of claim 1, wherein the connection is established via a near field communications component on the mobile computing device and the computing device.

3. The method of claim 1, wherein the mobile device is configured to generate the security value in response to being positioned within the specified proximity of the computing device.

4. The method of claim 3, wherein mobile device generates the security value, at least in part, based on a shared secret stored on the mobile device.

5. A method for performing a two-factor authentication process, the method comprising:
  detecting, by a mobile computing device, that the mobile computing device is positioned within a specified proximity of a computing device;
  in response:
    generating a security value,
    establishing a connection with the computing device, and
    passing, over the connection, the security value to the computing device,
  wherein a browser helper object on the computing device is configured to populate a login form rendered by a browser application with the security value.

6. The method of claim 5, wherein mobile device generates the security value, at least in part, based on a shared secret stored on the mobile device.

7. A non-transitory computer-readable storage medium storing instructions, which, when executed on a processor, performs an operation for performing a two-factor authentication process, the operation comprising:
  detecting a mobile computing device being positioned within a specified proximity of a computing device;
  establishing a connection with the mobile computing device;
  receiving, over the connection, a security value;
  passing the security value to a browser helper object on the computing device;
  populating a login form with the security value, wherein the login form is rendered on a browser executing on the computing device, wherein the login form includes fields for a username, a password, and the security value, and wherein the browser helper object populates the field for the security value with the security value; and
  posting the login form to a network application.

8. The computer-readable storage medium of claim 7, wherein the connection is established via a near field communications component on the mobile computing device and the computing device.

9. The computer-readable storage medium of claim 7, wherein the mobile device is configured to generate the security value in response to being positioned within the specified proximity of the computing device.

10. The computer-readable storage medium of claim 9, wherein mobile device generates the security value, at least in part, based on a shared secret stored on the mobile device.

11. A system, comprising:
  a near field communications (NFC) transceiver;
  a processor; and
  a memory hosting an application, which, when executed on the processor, performs an operation for performing a two-factor authentication process, the operation comprising:
    detecting a mobile computing device being positioned within a specified proximity of a computing device,
    establishing, via the NFC transceiver, a connection with the mobile computing device,
    receiving, over the connection, a security value,
    passing the security value to a browser helper object on the computing device,
    populating a login form with the security value, wherein the login form is rendered on a browser executing on the computing device, wherein the login form includes fields for a username, a password, and the security value, and wherein the browser helper object populates the field for the security value with the security value, and
    posting the login form to a network application.

12. The system of claim 11, wherein the mobile device is configured to generate the security value in response to being positioned within the specified proximity of the computing device.

13. The system of claim 12, wherein mobile device generates the security value, at least in part, based on a shared secret stored on the mobile device.

14. A mobile computing device, comprising:
  a near field communications (NFC) transceiver;
  a processor; and
  a memory hosting an application, which, when executed on the processor, performs an operation for performing a two-factor authentication process, the operation comprising
    detecting, by the mobile computing device, that the mobile computing device is positioned within a specified proximity of a computing device;
    in response:
      generating a security value,
      establishing a connection with the computing device, and
      passing, over the connection, the security value to the computing device, wherein a browser helper object on the computing device is configured to populate a login form rendered by a browser application with the security value.

15. The mobile device of claim 14, wherein mobile device generates the security value, at least in part, based on a shared secret stored on the mobile device.

* * * * *